United States Patent
Haramaty et al.

(10) Patent No.: US 10,230,652 B2
(45) Date of Patent: Mar. 12, 2019

(54) COMBINED PAUSE-RESUME AND CREDIT-BASED FLOW-CONTROL

(71) Applicant: MELLANOX TECHNOLOGIES TLV LTD., Ra'anana (IL)

(72) Inventors: Zachy Haramaty, Hemed (IL); Barak Gafni, Campbell, CA (US); Aviv Kfir, Nili (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 23 days.

(21) Appl. No.: 15/465,626

(22) Filed: Mar. 22, 2017

(65) Prior Publication Data

US 2018/0278536 A1    Sep. 27, 2018

(51) Int. Cl.
*H04L 12/26* (2006.01)
*H04L 12/801* (2013.01)
*H04L 12/841* (2013.01)

(52) U.S. Cl.
CPC ............ *H04L 47/39* (2013.01); *H04L 47/283* (2013.01)

(58) Field of Classification Search
None
See application file for complete search history.

(56) References Cited

U.S. PATENT DOCUMENTS

| | | | |
|---|---|---|---|
| 6,657,961 B1 * | 12/2003 | Lauffenburger | H04L 12/5601 370/231 |
| 2004/0170127 A1 * | 9/2004 | Tanaka | H04L 47/10 370/235 |
| 2005/0239435 A1 * | 10/2005 | Ikeda | H04L 47/10 455/403 |
| 2012/0250511 A1 * | 10/2012 | Neeser | H04L 47/12 370/235 |
| 2013/0208595 A1 * | 8/2013 | Connolly | H04L 47/266 370/235 |
| 2014/0280885 A1 * | 9/2014 | Ayandeh | H04L 43/0894 709/224 |
| 2016/0142317 A1 * | 5/2016 | Yang | H04L 47/30 370/429 |
| 2017/0279741 A1 * | 9/2017 | Elias | H04L 49/9005 |

OTHER PUBLICATIONS

IEEE Std 802.3™, "IEEE Standard for Ethernet", Section Two, 60 pages, Sep. 3, 2015.
IEEE P802.1Qbb/D2.3, "Draft Standard for Local and Metropolitan Area Networks: Virtual Bridged Local Area Networks—Amendment: Priority-based Flow Control", 40 pages, May 25, 2010.

(Continued)

*Primary Examiner* — Kwang B Yao
*Assistant Examiner* — Juvena W Loo
(74) *Attorney, Agent, or Firm* — Kligler & Associates

(57) ABSTRACT

A communication system includes a transmit (TX) device and a receive (RX) device. The TX device is configured to transmit data over a communication link. The RX device is configured to receive the data transmitted by the TX device over the communication link, to buffer the received data in an RX buffer, to assess a fill level of the RX buffer, to select, depending on the fill level of the RX buffer, either a pause-resume flow-control scheme or a credit-based flow-control scheme, and to apply the selected flow-control scheme in coordination with the TX device.

23 Claims, 5 Drawing Sheets

(56) References Cited

OTHER PUBLICATIONS

IEEE Std 802.1Q™, "IEEE Standard for Local and metropolitan area networks: Bridges and Bridged Networks", Chapter 36, 9 pages, Nov. 3, 2014.
InfiniBand™ Architecture Specification vol. 1, Release 1.3, chapters 3.7.2 and 7.9, 72 pages, Mar. 3, 2015.
Kung et al., "Credit-Based Flow Control for ATM Networks: Credit Update Protocol,Adaptive Credit Allocation, and Statistical Multiplexing", SIGCOMM Conference on communications Architectures, Protocols and Applications, London, UK, pp. 101-114, Aug. 31-Sep. 2, 1994.
Kung et al., "Credit-Based Flow Control for ATM Networks," IEEE Network Magazine, 11 pages, Mar. 1995.

\* cited by examiner

COMBINED PAUSE-RESUME AND CREDIT-BASED FLOW-CONTROL

FIELD OF THE INVENTION

The present invention relates generally to communication networks, and particularly to methods and systems for flow-control.

BACKGROUND OF THE INVENTION

In various types of data communication networks, network elements such as switches and Network Interface Controllers (NICs) use link-level flow-control on the network links that connect them.

Ethernet™ networks, for example, use a flow-control mechanism referred to as XON/XOFF. Ethernet flow-control is specified, for example, in Annexes 31B and 31D of IEEE Standard 802.3-2015, entitled "IEEE Standard for Ethernet," March, 2016; in IEEE draft standard P802.1Qbb/D2.3, entitled "Virtual Bridged Local Area Networks—Amendment: Priority-based Flow Control," May, 2010; and in chapter 36 of IEEE Standard 802.1Q-2014, entitled "IEEE Standard for Local and metropolitan area networks—Bridges and Bridged Networks," 2014, which are incorporated herein by reference.

Other network protocols, such as Infiniband™ and Asynchronous Transfer Mode (ATM), use credit-based link-level flow-control. Credit-based flow-control in InfiniBand networks is specified, for example, in sections 3.7.2 and 7.9 of "Infiniband™ Architecture Specification Volume 1," Release 1.3, March, 2015, which is incorporated herein by reference.

Credit-based flow-control schemes for ATM are described, for example, by Kung et al., in "Credit-Based Flow Control for ATM Networks: Credit Update Protocol, Adaptive Credit Allocation, and Statistical Multiplexing," Proceeding of SIGCOMM '94 Conference on Communications Architectures, Protocols and Applications, London, United Kingdom, August 31-Sep. 2, 1994, pages 101-114, which is incorporated herein by reference; and by Kung and Morris, in "Credit-Based Flow Control for ATM Networks," IEEE Network Magazine, volume 9, issue 2, March, 1995, pages 40-48, which is incorporated herein by reference.

SUMMARY OF THE INVENTION

An embodiment of the present invention that is described herein provides a communication system including a transmit (TX) device and a receive (RX) device. The TX device is configured to transmit data over a communication link. The RX device is configured to receive the data transmitted by the TX device over the communication link, to buffer the received data in an RX buffer, to assess a fill level of the RX buffer, to select, depending on the fill level of the RX buffer, either a pause-resume flow-control scheme or a credit-based flow-control scheme, and to apply the selected flow-control scheme in coordination with the TX device.

In some embodiments, the RX device is configured to compare the fill level of the RX buffer to a threshold, to select the pause-resume flow-control scheme when the fill level is below the threshold, and to select the credit-based flow-control scheme when the fill level is above the threshold. In an embodiment, the threshold depends on a Round-Trip Time (RTT) over the communication link multiplied by a bandwidth of transferring the data.

In some embodiments, the TX device and the RX device are configured to manage a counter of transmitted data and a counter of received data, respectively, in accordance with a first counter management scheme while applying the pause-resume flow-control scheme, and in accordance with a second counter management scheme while applying the credit-based flow-control scheme. In an example embodiment, the TX device is configured to: not increment the counter of the transmitted data while applying the pause-resume flow-control scheme; initialize the counter of the transmitted data in response to receiving an instruction from the RX device to transition to the credit-based flow control scheme; and increment the counter of the transmitted data while applying the credit-based flow-control scheme.

In an embodiment, the RX device is configured to: not increment the counter of the received data while applying the pause-resume flow-control scheme; and increment the counter of the received data only while applying the credit-based flow-control scheme. In another embodiment, the RX device is configured to start incrementing the counter of the received data in response to receiving from the TX device a notification that the counter of the transmitted data has been initialized.

In yet another embodiment, the TX device is configured to send to the RX device a notification that the counter of the transmitted data has been initialized, and the RX device is configured to send a first credit message in response to receiving the notification, and to start incrementing the counter of the received data only in response to receiving first data following the first credit message.

In a disclosed embodiment, upon transitioning to the credit-based flow-control scheme, the RX device is configured to initialize the counter of the received data to a negative value. In an embodiment, upon initializing the counter of the received data, the RX device is configured to increment the counter of the received data artificially, irrespective of actual reception of data from the TX device.

In some embodiments, the TX device and the RX device are configured to increment the counter of the transmitted data and the counter of the received data, both while applying the pause-resume flow-control scheme and while applying the credit-based flow-control scheme. In an example embodiment, the TX device is configured to: while applying the credit-based flow-control scheme, send to the RX device updated values of the counter of the transmitted data at a first update rate; and while applying the pause-resume flow-control scheme, send the updated values at a second update rate, smaller than the first update rate.

There is additionally provided, in accordance with an embodiment of the present invention, a method for communication including transmitting data over a communication link from a transmit (TX) device to a receive (RX) device. In the RX device, the data transmitted by the TX device is received over the communication link, the received data is buffered in an RX buffer, a fill level of the RX buffer is assessed. Either a pause-resume flow-control scheme or a credit-based flow-control scheme is selected, depending on the fill level of the RX buffer. The selected flow-control scheme is applied in coordination with the TX device.

There is further provided, in accordance with an embodiment of the present invention, a communication device including a receive (RX) buffer and flow-control logic. The RX buffer is configured to buffer data received over a communication link from a peer communication device. The flow-control logic is configured to assess a fill level of the RX buffer and, depending on the fill level, to select either a pause-resume flow-control scheme or a credit-based flow-control scheme, and to apply the selected flow-control scheme in coordination with the peer communication device.

The present invention will be more fully understood from the following detailed description of the embodiments thereof, taken together with the drawings in which:

DETAILED DESCRIPTION OF EMBODIMENTS

Overview

Figure 1:
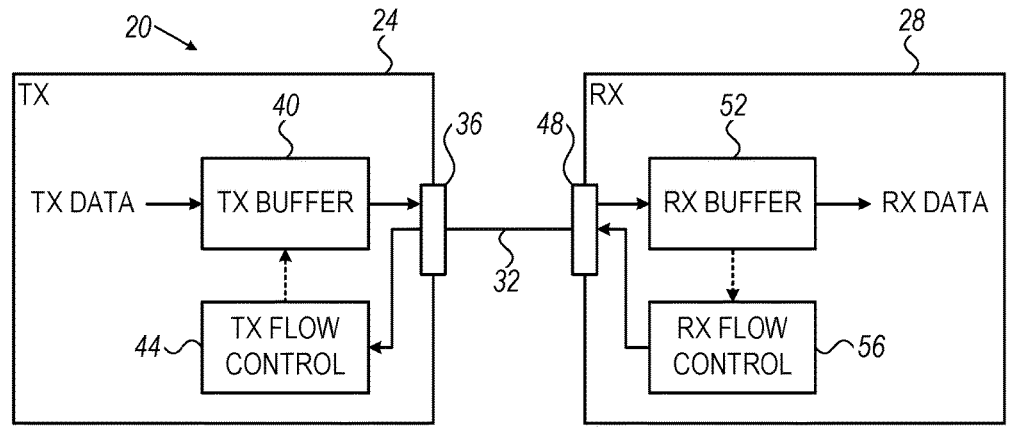
FIG. 1 is a block diagram that schematically illustrates a communication system that uses combined pause-resume and credit-based flow-control, in accordance with an embodiment of the present invention.

Embodiments of the present invention that are described herein provide improved methods and systems for flow-control between communication devices. In some disclosed embodiments, one communication device (referred to herein as "TX device") transmits data to another communication device (referred to as "RX device") over a communication link. Each of the communication devices may comprise, for example, a network switch or NIC.

The TX device and RX device apply link-level flow-control over the communication link between them, in order to avoid loss of data. Typically, the RX device buffers the data received from the TX device in an RX buffer. The RX device monitors the fill level of the RX buffer, and signals the TX device to throttle the transmission of the data so as to prevent the RX buffer from overflowing.

In the disclosed embodiments, the RX device switches adaptively between two flow-control schemes, referred to as pause-resume flow-control and credit-based flow-control. In the context of the present patent application and in the claims, the term "pause-resume flow-control" refers to flow-control schemes in which the RX device uses two commands: A PAUSE command instructs the TX device to stop transmitting data, and a RESUME command instructs the TX device to resume transmission of data. The term "credit-based flow-control" refers to flow-control schemes in which the RX device sends to the TX device some quantitative measure, which is indicative of the amount of data that the TX device is allowed to transmit.

As will be explained in detail below, pause-resume flow-control schemes and credit-based flow-control schemes have different characteristics and different pros and cons. For example, pause-resume flow-control incurs considerably smaller signaling overhead over the communication link than credit-based flow-control. On the other hand, pause-resume flow-control requires a larger RX buffer, typically twice the RX buffer size required by credit-based flow-control, in order to perform well.

In the embodiments described herein, the RX device decides which flow-control scheme to use at a particular time, based on the current actual fill level of the RX buffer. When the fill level is relatively low, the RX device applies pause-resume flow-control, thereby reducing signaling traffic. If the fill level is too high, the RX device reverts to credit-based flow-control. In some embodiments, the RX device decides to switch from one flow-control scheme to the other by comparing the RX buffer fill level to the Round-Trip Time (RTT) over the communication link multiplied by the bandwidth of transferring the data over the communication link.

Four different non-limiting examples of combining pause-resume and credit-based flow-control are described herein. The examples differ from one another in the way the RX device and TX device switch between pause-resume and credit-based flow-control, in implementation complexity, and in the achievable performance. The four example schemes are described in logical order of explanation, starting from the scheme that is easiest to explain, and not necessarily in any order of importance, implementation complexity or performance gain.

System Description

FIG. 1 is a block diagram that schematically illustrates a communication system 20 that uses combined pause-resume and credit-based flow-control, in accordance with an embodiment of the present invention. System 20 comprises two communication devices—A transmitter (TX) device 24 and a receiver (RX) device 28—which communicate over a communication link 32. Each of communication devices 24 and 28 may comprise, for example, a network element such as a switch or router, a network interface of a host such as a Network Interface Controller (NIC), or any other suitable communication device. Link 32 may comprise any suitable communication link, e.g., an optical fiber or copper link.

In a typical application, communication devices 24 and 28 are part of a large communication network that comprises multiple communication devices and network links. Moreover, each of devices 24 and 28 may comprise multiple ports that connect the device to multiple other communication devices via multiple links. Since, however, the embodiments described herein refer mainly to link-level flow-control, FIG. 1 focuses on a pair of communication devices and the link between them, for the sake of clarity.

Moreover, in practice, communication devices 24 and typically conduct bidirectional data communication between them. Nevertheless, FIG. 1 focuses of the data transmission aspects of device 24, and of the data reception aspects of device 28, for the sake of clarity. For the same reason, elements of devices 24 and 28 that are not mandatory for understanding of the disclosed techniques have been omitted from the figure.

In the example of FIG. 1, TX device 24 comprises a port 36 for connecting to link 32, a TX buffer 40 for buffering the data pending for transmission, and TX flow-control logic 44 for applying the flow-control techniques described herein. RX device 28 comprises a port 48 for connecting to link 32, an RX buffer 52 for buffering the data received over link 32, and RX flow-control logic 56 for applying the flow-control techniques described herein. TX flow-control logic 44 and RX flow-control logic 56 are also referred to simply as "TX logic" and "RX logic" for brevity.

The system and communication device configurations shown in FIG. 1 are example configurations, which are chosen purely for the sake of conceptual clarity. In alternative embodiments, any other suitable system and/or communication device configuration can be used. Certain elements of communication devices 24 and 28 may be implemented using hardware/firmware, such as using one or more discrete components, Application-Specific Integrated Circuits (ASICs) or Field-Programmable Gate Arrays (FPGAs). Alternatively, some elements of communication devices 24 and 28 may be implemented in software or using a combination of hardware/firmware and software elements. Buffers 40 and 52 may be implemented, for example, using Random Access Memory (RAM) or any other suitable type of memory.

In some embodiments, certain functions of communication devices 24 and 28, such as some or all functions of TX flow-control logic 44 and/or some or all functions of RX flow-control logic 56, may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Trade-Offs Between Pause-Resume and Credit-Based Flow-Control

Pause-resume flow-control schemes and credit-based flow-control schemes have different pros and cons, and may each be preferable under different circumstances. Consider, for example, a scenario in which TX device 24 and RX device 28 apply pause-resume flow-control. The TX device transmits data, and at some point in time the RX device issues a PAUSE command. Let RTT denote the round-trip time (i.e., two-way propagation time) over link 32, and let BW denote the bandwidth of data transmission over link 32. Assume also that the Maximal Transmission Unit (MTU) of the TX device is small relative to RTT•BW (MTU<<RTT•BW), or that the value of RTT already accounts for the MTU.

Assuming that the RX device issues the PAUSE command at time t=T0, and that the TX device stops transmitting data immediately upon receiving the PAUSE command, data will actually stop reaching the RX device only at time t=T0+RTT. Therefore, in order to ensure lossless buffering, the size of RX buffer 52 should be at least RTT•BW, and preferably more. An RX buffer size of 2•RTT•BW is sometimes preferable.

Credit-based flow-control typically does not impose such a constraint on the size of RX buffer 52. When using credit-based flow-control, at some point the TX device will run out of credits and stop transmitting, regardless of the size of RX buffer 52. The smaller RX buffer size means lower size and cost of the RX device. On the other hand, credit-based flow-control incurs more signaling overhead on link 32, at the expense of usable bandwidth.

Thus, in some embodiments, RX flow control logic 56 of RX device 28 switches between pause-resume flow-control and credit-based flow-control adaptively, depending on the current fill level of RX buffer 52.

Infiniband Credit-Based Flow-Control

In the embodiments described herein, when applying credit-based flow-control, devices 24 and 28 use a credit-based flow-control scheme that is similar to the scheme specified in section 7.9 of "Infiniband™ Architecture Specification Volume 1," cited above. In this scheme, the basic data unit for flow-control purposes is referred to as a block, and the following parameters are used:

Flow-Control Credit Limit (FCCL)—A value sent from the RX device to the TX device. FCCL specifies the total number of blocks that the TX device is allowed to transmit since link initiation.

Flow-Control Total Blocks sent (FCTBS)—A value sent from the TX device to the RX device. FCTBS specifies the total number of blocks that the TX device actually transmitted since link initiation.

Adjusted Blocks Received (ABR)—A value maintained by the RX device. ABR specifies the number of blocks that the RX device actually received since link initiation.

In a typical flow-control process, the RX device occasionally updates FCCL to be equal to ABR+RAVAIL, wherein RAVAIL denotes the available free space in the RX buffer, in block units, and sends the updated FCCL value to the TX device. This credit allowance essentially permits the TX device to transmit a number of blocks that would fill the RX buffer.

The TX device transmits data to the RX device, and in parallel (i) verifies that the FCCL allowance is not exceeded, and (ii) updates FCTBS. If FCTBS becomes equal to the most-recently received FCCL, the TX device stops transmitting data until receiving an updated FCCL.

The RX device receives the data from the TX device and buffers the data in RX buffer 52. The RX device continuously updates ABR to reflect the number of received block, and updates RAVAIL to reflect the current free space in the RX buffer. RAVAIL is decremented when buffering additional data, and incremented when reading data out of the RX buffer.

During the above process, ABR=FCTBS as long as no data is lost between the TX device and the RX device. In order to avoid inconsistency between the TX device and the RX device in case of data loss, the TX device occasionally reports the current FCTBS value to the RX device. Upon receiving the reported FCTBS value, the RX device sets ABR to this value.

Additional details regarding Infiniband flow-control are given in section 7.9 of "Infiniband™ Architecture Specification Volume 1," cited above.

Combined Pause-Resume and Credit-Based Flow-Control

FIGS. 2A, 2B and 3-5 are diagrams that schematically illustrate exchanging of messages in combined pause-resume and credit-based flow-control processes, in accordance with embodiments of the present invention.

In all these diagrams, the "TX" axis on the left-hand side corresponds to the time axis at TX device 24. The current value of FCTBS, as it changes over time, is listed to the left of the TX axis. The "RX" axis on the right-hand side corresponds to the time axis at RX device 28. The current values of ABR and RAVAIL, as they change over time, are listed to the right of the RX axis.

Note that the listed RAVAIL values are normalized by the bandwidth BW. In other words, in the description that follows, references to RAVAIL values and buffer fill levels of RTT or 2•RTT actually refer to a memory space of RTT•BW and 2•RTT•BW, respectively.

Scheme #1

Figure 2A:
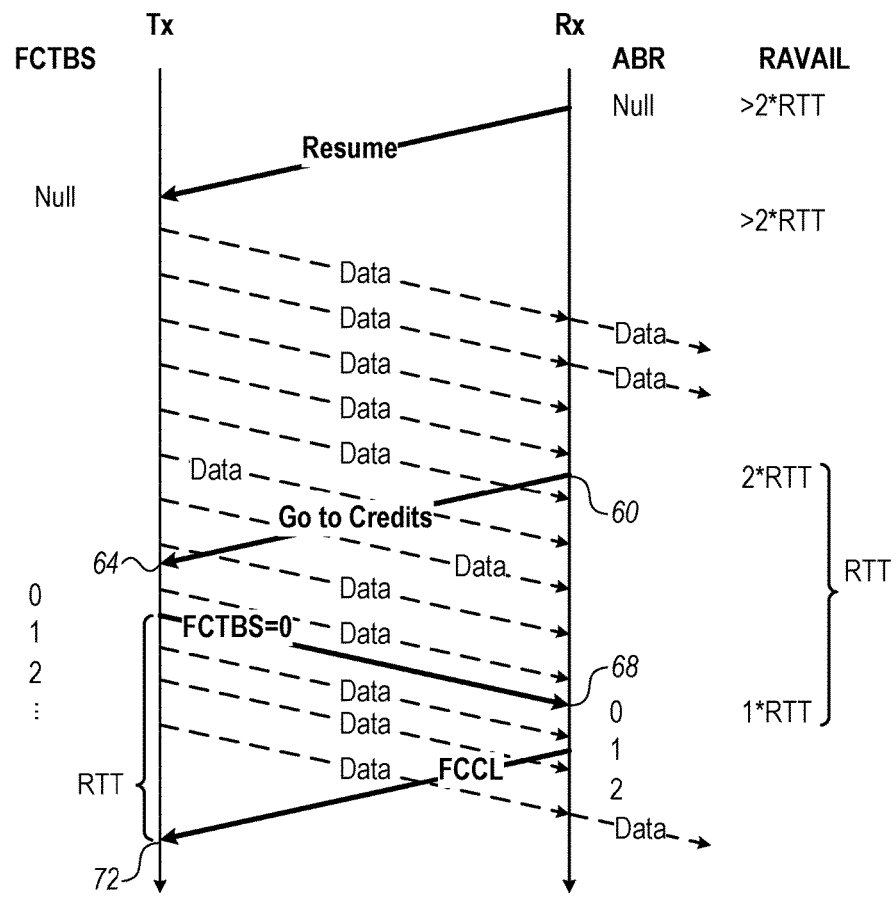
FIGS. 2A, 2B and 3-5 are diagrams that schematically illustrate exchanging of messages in combined pause-resume and credit-based flow-control processes, in accordance with embodiments of the present invention.
Figure 2B:
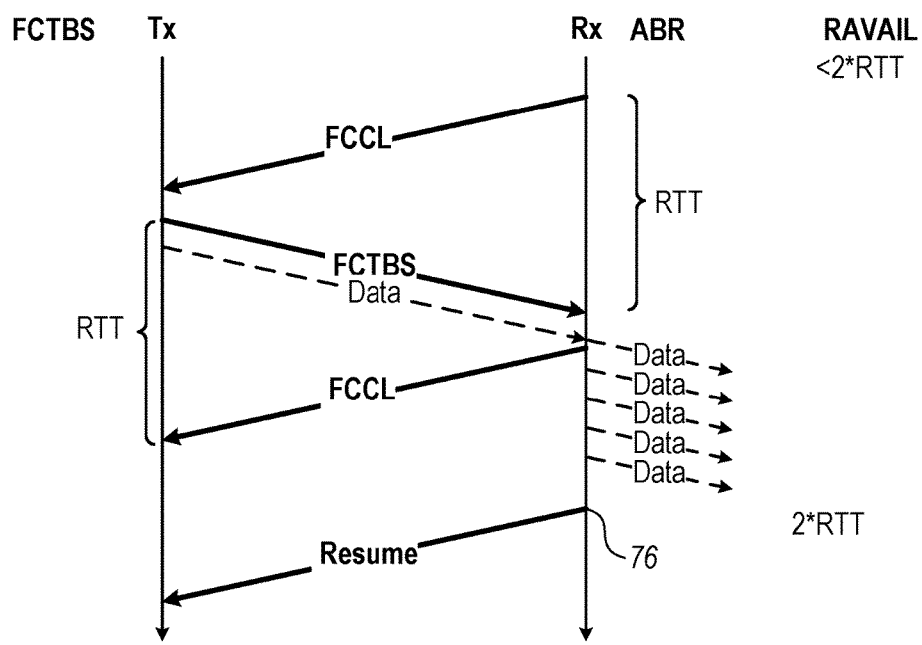

FIGS. 2A and 2B illustrate a combined flow-control scheme referred to as "Scheme #1", in accordance with an embodiment of the present invention. Scheme #1 is relatively simple to implement, but on the other hand requires a large RX buffer size of at least 2•RTT.

In scheme #1, RX logic 56 monitors the fill level of RX buffer 52. If the free buffer space (RAVAIL) is above 2•RTT, RX logic 56 applies pause-resume flow-control. If RAVAIL is below 2·RTT, RX logic 56 applies credit-based flow-control. Typically, RX logic 56 adds some extent of hysteresis to the above threshold. For example, RX logic may switch-over from credit-based to pause-resume flow-control when RAVAIL is 2·RTT+Δ, and switch-over from pause-resume to credit-based flow-control when RAVAIL is 2·RTT.

FIG. 2A illustrates an example of transitioning from pause-resume flow-control to credit-based flow-control in scheme #1. At the beginning of this example, RAVAIL is larger than 2·RTT, and therefore devices 24 and 28 apply pause-resume flow-control. The example begins with RX logic 56 issuing a RESUME command. Upon receiving the RESUME command, TX logic 44 begins to send data from TX buffer 40 to RX device 28. RX device 28 receives the data, buffers the data in RX buffer 52, and gradually reads and processes the buffered data. When applying pause-resume flow-control, RX logic 56 and TX logic 44 do not update the ABR and FCTBS values, and RX logic 56 does not transmit credit messages (FCCL updates).

In the present example, RX device 28 reads data from RX buffer 52 at a relatively low rate (lower than the rate with which the buffer is filled). Therefore, at a time marked 60 in the figure, RAVAIL drops below 2·RTT. In response to detecting this fill level (with possibly some hysteresis margin as explained above), RX logic 56 switches-over to credit-based flow-control.

Upon switch-over, RX logic 56 sends a "GO TO CREDITS" command to TX logic 44, instructing the TX logic to switch-over to credit-based flow-control as well. In response to receiving the "GO TO CREDITS" command from RX logic 56, at a time marked 64, TX logic 44 initializes FCTBS to zero. TX logic 44 then reports the initialized value of FCTBS=0 to RX logic 56.

TX logic 44 continues to transmit data as before, but now it also increments the value of FCTBS with every block of data being transmitted. RX logic 56, however, is not yet able to increment ABR. Only at a time marked 68, RX logic 56 receives the reported FCTBS=0. At this point RX logic 56 initializes ABR to zero, and begins to increment ABR with every block being received.

RX logic 56 also occasionally sends credit messages (FCCL updates) to TX device 24. Only at a time marked 72, upon receiving the first credit message (FCCL update) after the switch-over to credit-based flow-control, devices 24 and 28 can truly begin to fully operate using the credit-based flow-control scheme.

FIG. 2B illustrates an example of transitioning from credit-based flow-control to pause-resume flow-control in scheme #1. At the beginning of this example, RAVAIL is smaller than 2·RTT, and therefore devices 24 and 28 apply credit-based flow-control. As can be seen in the figure, RX logic 52 occasionally sends to TX device 24 a credit message with an updated FCCL value. TX logic 44 sends data blocks within the credit allowance, and occasionally reports the updated FCTBS value to RX device 28.

In the present example, RX device reads data from RX buffer 52 at a relatively high rate (higher than the rate with which the buffer is filled). Therefore, at a time marked 76, RAVAIL at the RX device becomes higher than 2·RTT. In response to detecting this fill level (with possibly some hysteresis margin), RX logic 56 switches-over to pause-resume flow-control and issues a RESUME command.

Scheme #2

Figure 3:
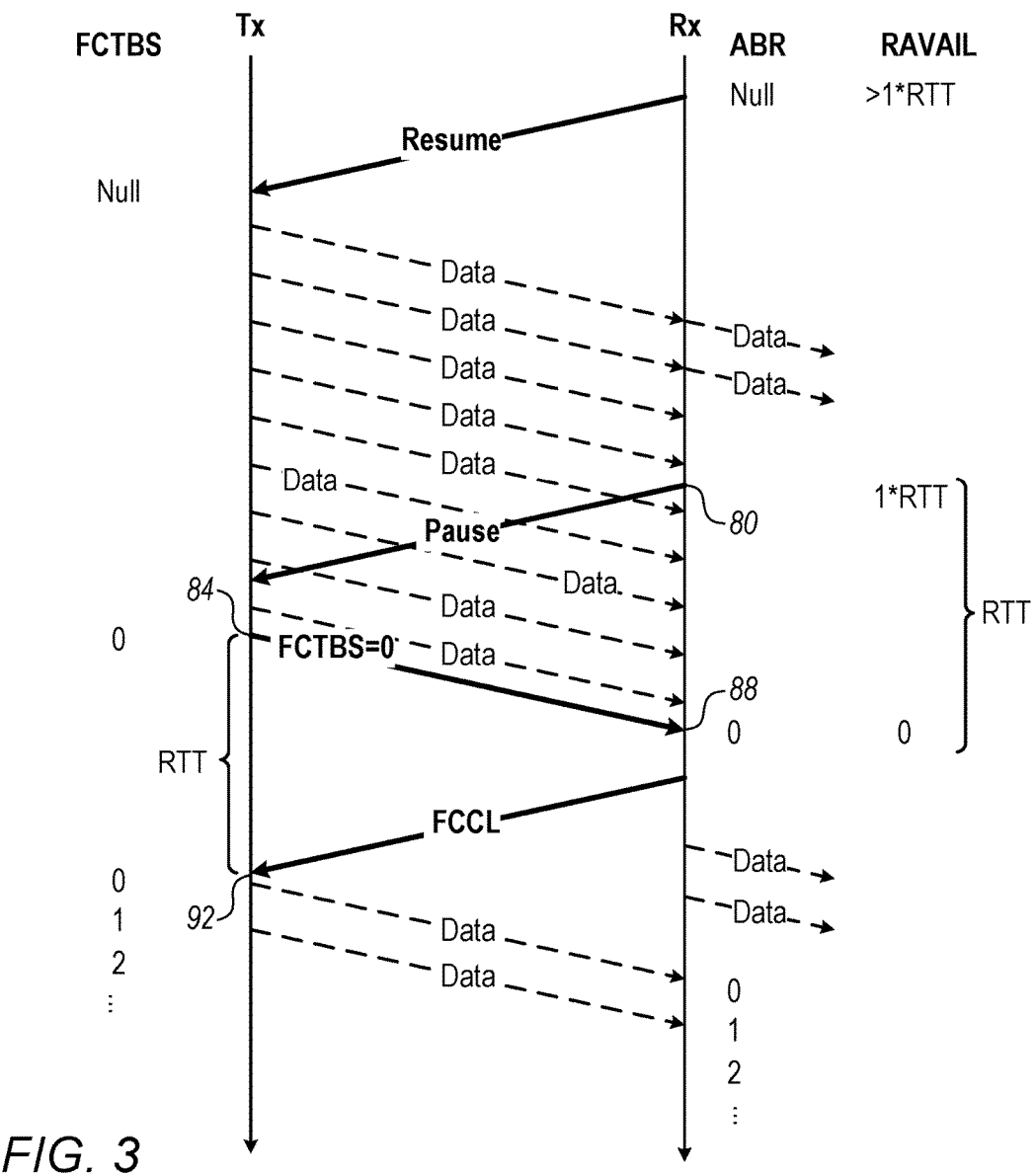

FIG. 3 illustrates another combined flow-control scheme referred to as "Scheme #2", in accordance with an embodiment of the present invention. In scheme #2, RX logic 56 monitors the fill level of RX buffer 52. If RAVAIL is above RTT, RX logic 56 applies pause-resume flow-control. If RAVAIL is below RTT, RX logic 56 applies credit-based flow-control. As in scheme #1 above, RX logic 56 may introduce some hysteresis to this threshold.

At the beginning of the example of FIG. 3, RAVAIL is larger than RTT, and therefore devices 24 and 28 apply pause-resume flow-control. The example begins with RX logic 56 issuing a RESUME command. Upon receiving the RESUME command, TX logic 44 begins to send data from TX buffer 40 to RX device 28. RX device 28 receives the data, buffers the data in RX buffer 52, and gradually reads and processes the buffered data. When applying pause-resume flow-control, RX logic 56 and TX logic 44 do not update the ABR and FCTBS values, and RX logic 56 does not transmit credit messages (FCCL updates).

In the present example, RX device 28 reads data from RX buffer 52 at a relatively low rate (lower than the rate with which the buffer is filled). Therefore, at a time marked 80, RAVAIL drops below RTT. In response to detecting this fill level (with possibly some hysteresis margin as explained above), RX logic 56 switches-over to credit-based flow-control.

In scheme #2, upon switching-over to credit-based flow-control, RX logic 56 sends a PAUSE command to TX device 24. In response to receiving the PAUSE command at a time marked 84, TX logic 44 (i) stops transmitting data, (ii) switches over to credit-based flow-control, (iii) initializes FCTBS to zero, and (iv) reports FCTBS=0 to RX device 28.

In response to receiving the FCTBS=0 report at a time 88, RX logic 56 initializes ABR to zero. From this point RX logic 56 begins to fully apply credit-based flow-control, including incrementing ABR and sending credit messages with updated values of FCCL. Upon receiving the first FCCL update since the switch-over, at a time 92, TX logic 44 begins to transmit data in accordance with the allowed credit count, and increments FCTBS accordingly.

If at some stage RAVAIL becomes larger than RTT (optionally with hysteresis), RX logic 56 switches-over to pause-resume flow-control. Upon this switch-over, RX logic 56 sends a RESUME command, which signals to TX logic 44 to switch-over to pause-resume flow-control as well.

Scheme #2 is also relatively simple to implement, and outperforms conventional pause-resume flow-control. One drawback, which can be seen in FIG. 3, is that during the time interval between times 84 and 92, TX device 24 is idle and does transmit.

Scheme #3

Figure 4:
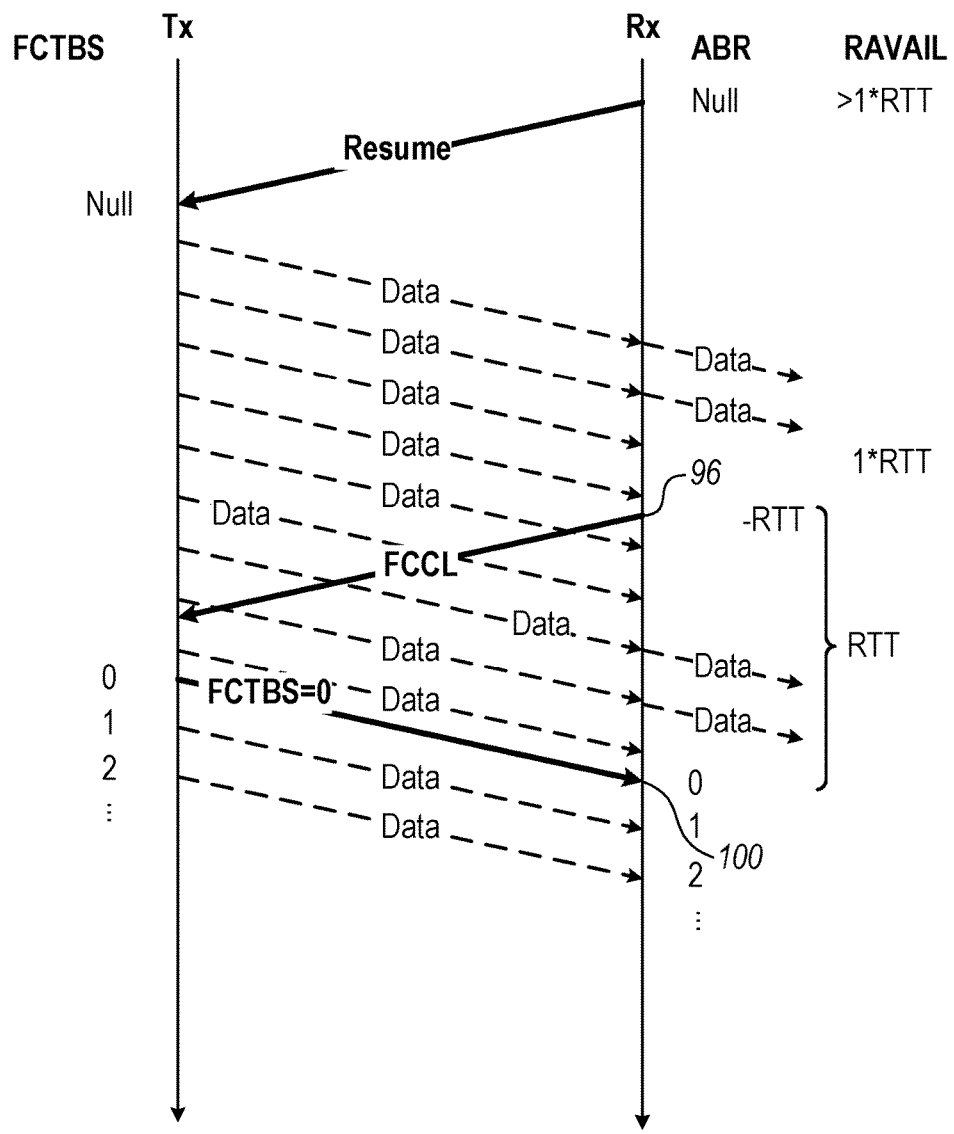

FIG. 4 illustrates yet another combined flow-control scheme referred to as "Scheme #3", in accordance with an embodiment of the present invention. In scheme #3, RX logic 56 monitors the fill level of RX buffer 52. If RAVAIL is above RTT, RX logic 56 applies pause-resume flow-control. If RAVAIL is below RTT, RX logic 56 applies credit-based flow-control. As in schemes #1 and #2 above, RX logic 56 may introduce some hysteresis to this threshold.

At the beginning of the example of FIG. 4, RAVAIL is larger than RTT, and therefore devices 24 and 28 apply pause-resume flow-control. The example begins with RX logic 56 issuing a RESUME command. Upon receiving the RESUME command, TX logic 44 begins to send data from TX buffer 40 to RX device 28. RX device 28 receives the data, buffers the data in RX buffer 52, and gradually reads and processes the buffered data. When applying pause-resume flow-control, RX logic 56 and TX logic 44 do not update the ABR and FCTBS values, and RX logic 56 does not transmit credit messages (FCCL updates).

In the present example, RX device 28 reads data from RX buffer 52 at a relatively low rate (lower than the rate with which the buffer is filled). Therefore, at a time marked 96, RAVAIL drops below RTT. In response to detecting this fill level (with possibly some hysteresis margin as explained above), RX logic 56 switches-over to credit-based flow-control.

In scheme #3, upon switching-over to credit-based flow-control, RX logic 56 sets ABR to a negative value, expressed as –RTT. RX logic 56 then sends a credit message (FCCL update) to TX device 24. In the credit message, RX logic 56 still calculates and reports FCCL normally, i.e., sets FCCL=ABR+RAVAIL. In the present example, however, ABR is negative. In the non-limiting numerical example shown in FIG. 4, ABR is set to –RTT.

When the credit message (FCCL update) eventually reaches TX device 24, TX logic 44 (i) resets FCTBS to zero, (ii) reports FCTBS=0 to RX device 28, and (iii) begins to increment FCTBS with every data block being transmitted.

During the time period from sending the FCCL update (time 96) until receiving the FCTBS=0 report (time 100), RX logic 56 increments ABR artificially, regardless of whether data actually arrives from TX device 24 or not. The rate with which RX logic 56 increments ABR is chosen to match the expected bandwidth (not the actual bandwidth) of data transfer, e.g., based on past measurements.

By proper choice of the artificial update rate, the value of ABR (which is negative to begin with at time 96) reaches zero at the time of receiving the FCTBS=0 report (at time 100), and thus coincides with the FCTBS=0 value. From this point, RX logic 56 increments ABR based on the actual reception of data from TX device 24 (in synchronization with the incrementing of FCTBS by TX logic 44). At this stage devices 24 and 28 fully operate using credit-based flow-control.

As in the previous scheme, if at some stage RAVAIL becomes larger than RTT (optionally with some hysteresis margin), RX logic 56 switches-over to pause-resume flow-control. Upon this switch-over, RX logic 56 sends a RESUME command, which signals to TX logic 44 to switch-over to pause-resume flow-control as well.

As can be appreciated from the description above, scheme #3 achieves smooth and seamless transition from pause-resume flow-control to credit-based flow-control. In contrast to scheme #2, in scheme #3 the transition does not incur any idle time on link 32.

Scheme #4

Figure 5:
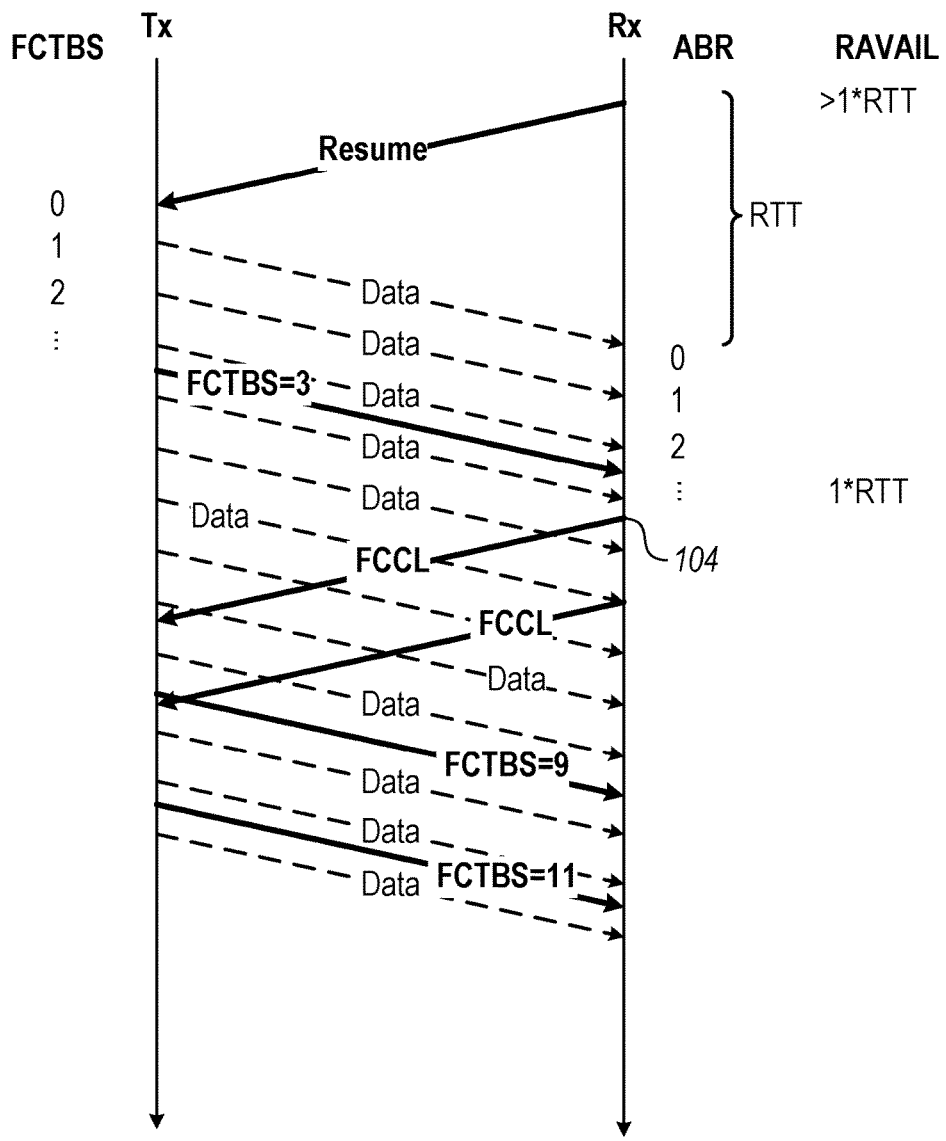

FIG. 5 illustrates yet another combined flow-control scheme referred to as "Scheme #4", in accordance with an embodiment of the present invention. In scheme #4, RX logic 56 monitors the fill level of RX buffer 52. If RAVAIL is above RTT, RX logic 56 applies pause-resume flow-control. If RAVAIL is below RTT, RX logic 56 applies credit-based flow-control. As in schemes #1-#3 above, RX logic 56 may introduce some hysteresis to this threshold.

At the beginning of the example of FIG. 5, RAVAIL is larger than RTT, and therefore devices 24 and 28 apply pause-resume flow-control. The example begins with RX logic 56 issuing a RESUME command. Upon receiving the RESUME command, TX logic 44 begins to send data from TX buffer 40 to RX device 28. RX device 28 receives the data, buffers the data in RX buffer 52, and gradually reads and processes the buffered data.

In contrast to the previous schemes, in scheme #4 RX logic 56 and TX logic 44 operate as follows while applying pause-resume flow-control:

RX logic 56 and TX logic 44 continue to update the ABR and FCTBS values, respectively.

RX logic 56 does not transmit credit messages (FCCL updates) to TX device 24.

TX logic 44 occasionally transmits FCTBS reports to RX device 28, but at a rate that is considerably smaller than the update rate used in credit-based flow-control. In one non-limiting example, TX logic 44 transmits an eight-byte credit packet, which comprises an FCTBS report, every 8Mbytes of data. This overhead of 1 ppm is negligible (overheads of up to 100 ppm are generally accepted as tolerable).

This mode of operation is shown at the top of FIG. 5, until reaching a time marked 104. At time 104, RAVAIL drops below RTT. In response to detecting this fill level (with possibly some hysteresis margin), RX logic 56 switches-over to credit-based flow-control by sending an FCCL update.

Scheme #4 retains ABR (in the RX device) and FCTBS (in the TX device) synchronized with one another, even while operating using pause-resume flow-control. This on-going synchronization enables smooth and seamless transition from pause-resume flow-control to credit-based flow-control. This performance is achieved with only minor additional signaling overhead.

The methods and systems described herein are not limited to any specific network type, and can also be used, for example, generally in lossless networks.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A communication system, comprising:
a transmit (TX) device, configured to transmit data over a communication link; and
a receive (RX) device, which is configured to:
receive the data transmitted by the TX device over the communication link;
buffer the received data in an RX buffer;
assess a fill level of the RX buffer;
compare the fill level of the RX buffer to a threshold;
select a pause-resume flow-control scheme when the fill level is below the threshold, and select a credit-based flow-control scheme when the fill level is above the threshold; and
apply the selected flow-control scheme in coordination with the TX device.

2. The communication system according to claim 1, wherein the threshold depends on a Round-Trip Time (RTT) over the communication link multiplied by a bandwidth of transferring the data.

3. The communication system according to claim 1, wherein the TX device and the RX device are configured to manage a counter of transmitted data and a counter of received data, respectively, in accordance with a first counter management scheme while applying the pause-resume flow-control scheme, and in accordance with a second counter management scheme while applying the credit-based flow-control scheme.

4. The communication system according to claim 3, wherein the TX device is configured to:
not increment the counter of the transmitted data while applying the pause-resume flow-control scheme;
initialize the counter of the transmitted data in response to receiving an instruction from the RX device to transition to the credit-based flow control scheme; and
increment the counter of the transmitted data while applying the credit-based flow-control scheme.

5. The communication system according to claim 4, wherein the RX device is configured to:
not increment the counter of the received data while applying the pause-resume flow-control scheme; and
increment the counter of the received data only while applying the credit-based flow-control scheme.

6. The communication system according to claim 4, wherein the RX device is configured to start incrementing the counter of the received data in response to receiving from the TX device a notification that the counter of the transmitted data has been initialized.

7. The communication system according to claim 4, wherein:
the TX device is configured to send to the RX device a notification that the counter of the transmitted data has been initialized; and
the RX device is configured to send a first credit message in response to receiving the notification, and to start incrementing the counter of the received data only in response to receiving first data following the first credit message.

8. The communication system according to claim 3, wherein, upon transitioning to the credit-based flow-control scheme, the RX device is configured to initialize the counter of the received data to a negative value.

9. The communication system according to claim 8, wherein, upon initializing the counter of the received data, the RX device is configured to increment the counter of the received data artificially, irrespective of actual reception of data from the TX device.

10. The communication system according to claim 3, wherein the TX device and the RX device are configured to increment the counter of the transmitted data and the counter of the received data, both while applying the pause-resume flow-control scheme and while applying the credit-based flow-control scheme.

11. The communication system according to claim 10, wherein the TX device is configured to:
while applying the credit-based flow-control scheme, send to the RX device updated values of the counter of the transmitted data at a first update rate; and
while applying the pause-resume flow-control scheme, send the updated values at a second update rate, smaller than the first update rate.

12. A method for communication, comprising:
transmitting data over a communication link from a transmit (TX) device to a receive (RX) device; and
in the RX device:
receiving the data transmitted by the TX device over the communication link;
buffering the received data in an RX buffer;
assessing a fill level of the RX buffer;
comparing the fill level of the RX buffer to a threshold;
selecting a pause-resume flow-control scheme when the fill level is below the threshold, and selecting a credit-based flow-control scheme when the fill level is above the threshold; and
applying the selected flow-control scheme in coordination with the TX device.

13. The method according to claim 12, wherein the threshold depends on a Round-Trip Time (RTT) over the communication link multiplied by a bandwidth of transferring the data.

14. The method according to claim 12, and comprising managing in the TX device and in the RX device a counter of transmitted data and a counter of received data, respectively, in accordance with a first counter management scheme while applying the pause-resume flow-control scheme, and in accordance with a second counter management scheme while applying the credit-based flow-control scheme.

15. The method according to claim 14, wherein managing the counter of the transmitted data comprises:
not incrementing the counter of the transmitted data while applying the pause-resume flow-control scheme;
initializing the counter of the transmitted data in response to receiving an instruction from the RX device to transition to the credit-based flow control scheme; and
incrementing the counter of the transmitted data while applying the credit-based flow-control scheme.

16. The method according to claim 15, wherein managing the counter of the received data comprises:
not incrementing the counter of the received data while applying the pause-resume flow-control scheme; and
incrementing the counter of the received data only while applying the credit-based flow-control scheme.

17. The method according to claim 15, wherein managing the counter of the received data comprises starting to increment the counter of the received data in response to receiving from the TX device a notification that the counter of the transmitted data has been initialized.

18. The method according to claim 15, and comprising:
sending from the TX device to the RX device a notification that the counter of the transmitted data has been initialized; and
in the RX device, sending a first credit message in response to receiving the notification, and starting to increment the counter of the received data only in response to receiving first data following the first credit message.

19. The method according to claim 14, wherein managing the counter of the received data comprises initializing the counter of the received data to a negative value upon transitioning to the credit-based flow-control scheme.

20. The method according to claim 19, and comprising, upon initializing the counter of the received data, incrementing the counter of the received data in the RX device artificially, irrespective of actual reception of data from the TX device.

21. The method according to claim 14, wherein managing the counter of the transmitted data and the counter of the received data comprises incrementing the counter of the transmitted data and the counter of the received data, both while applying the pause-resume flow-control scheme and while applying the credit-based flow-control scheme.

22. The method according to claim 21, wherein managing the counter of the transmitted data comprises:
- while applying the credit-based flow-control scheme, sending from the TX device to the RX device updated values of the counter of the transmitted data at a first update rate; and
- while applying the pause-resume flow-control scheme, sending the updated values at a second update rate, smaller than the first update rate.

23. A communication device, comprising:
- a receive (RX) buffer, which is configured to buffer data received over a communication link from a peer communication device; and
- flow-control logic, configured to:
  - assess a fill level of the RX buffer;
  - compare the fill level of the RX buffer to a threshold;
  - select a pause-resume flow-control scheme when the fill level is below the threshold, and select a credit-based flow-control scheme when the fill level is above the threshold; and
  - apply the selected flow-control scheme in coordination with the peer communication device.

* * * * *